US010169918B2

(12) United States Patent
Rehmeyer et al.

(10) Patent No.: US 10,169,918 B2
(45) Date of Patent: Jan. 1, 2019

(54) RELATIONAL RENDERING OF HOLOGRAPHIC OBJECTS

(71) Applicant: MICROSOFT TECHNOLOGY LICENSING, LLC, Redmond, WA (US)

(72) Inventors: Eric Scott Rehmeyer, Kirkland, WA (US); Alexander James Hogan, Mountlake Terrace, WA (US); Peter W. Carlson, Redmond, WA (US); Jessica Zahn, Redmond, WA (US); Jonathan Esterly, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 33 days.

(21) Appl. No.: 15/192,543

(22) Filed: Jun. 24, 2016

(65) Prior Publication Data
US 2017/0372518 A1    Dec. 28, 2017

(51) Int. Cl.
G06T 19/00    (2011.01)
G03H 1/22    (2006.01)
G06F 17/30    (2006.01)
G03H 1/00    (2006.01)

(52) U.S. Cl.
CPC ......... *G06T 19/006* (2013.01); *G03H 1/2249* (2013.01); *G06F 17/30017* (2013.01); *G03H 2001/0061* (2013.01); *G03H 2226/02* (2013.01)

(58) Field of Classification Search
CPC .............................. G06T 19/00; G06T 19/006

USPC ......................................................... 345/633
See application file for complete search history.

(56) References Cited

U.S. PATENT DOCUMENTS

| 5,684,943 | A | 11/1997 | Abraham et al. |
| 6,175,954 | B1 | 1/2001 | Nelson et al. |
| 8,292,733 | B2 | 10/2012 | Crawford et al. |
| 9,665,170 | B1 * | 5/2017 | Ross .................. G06F 3/011 |
| 2007/0024644 | A1 * | 2/2007 | Bailey ................ G06F 3/011 345/633 |
| 2009/0066690 | A1 * | 3/2009 | Harrison ............ G06T 19/006 345/419 |
| 2010/0245361 | A1 * | 9/2010 | Ofek ................. G06Q 30/0241 345/441 |
| 2011/0216060 | A1 * | 9/2011 | Weising .............. G09G 5/08 345/419 |

(Continued)

OTHER PUBLICATIONS

Yasutoshi Makino et al: "HaptoClone (Haptic-Optical Clone) for Mutual Tele-Environment by Real-time 3D Image Transfer with Midair Force Feedback", May 7, 2016.

(Continued)

*Primary Examiner* — Phong Nguyen
(74) *Attorney, Agent, or Firm* — Workman Nydegger (57) ABSTRACT

Computer systems, methods, and storage media for rendering a holographic object in accordance with a physical relationship between the holographic object and an identified physical object. Virtual properties are assigned to a physical object, and in response to detecting a change to the physical relationship between the holographic object and the physical object, the holographic object is rendered according to a modification defined, at least in part, by the change to the physical relationship and by the properties assigned to the physical object.

17 Claims, 7 Drawing Sheets

(56) References Cited

U.S. PATENT DOCUMENTS

| | | | |
|---|---|---|---|
| 2013/0137076 A1* | 5/2013 | Perez | G09B 5/06 434/308 |
| 2013/0194259 A1* | 8/2013 | Bennett | G06T 19/006 345/420 |
| 2013/0265333 A1 | 10/2013 | Ainsworth et al. | |
| 2013/0307855 A1 | 11/2013 | Lamb et al. | |
| 2013/0342564 A1* | 12/2013 | Kinnebrew | G09G 3/003 345/619 |
| 2013/0342570 A1* | 12/2013 | Kinnebrew | G09G 3/003 345/633 |
| 2014/0049559 A1* | 2/2014 | Fleck | G03H 1/2249 345/633 |
| 2014/0071163 A1* | 3/2014 | Kinnebrew | G03H 1/2249 345/633 |
| 2014/0071506 A1* | 3/2014 | Han | G03H 1/08 359/9 |
| 2014/0078176 A1* | 3/2014 | Kim | G06F 3/017 345/633 |
| 2014/0160162 A1 | 6/2014 | Balachandreswaran et al. | |
| 2014/0225898 A1* | 8/2014 | Fyke | G06T 11/00 345/473 |
| 2014/0267404 A1 | 9/2014 | Mitchell et al. | |
| 2014/0306891 A1* | 10/2014 | Latta | G06F 3/017 345/158 |
| 2014/0368537 A1* | 12/2014 | Salter | G06T 19/006 345/633 |
| 2015/0097862 A1* | 4/2015 | Reisner-Kollmann | G06T 19/006 345/633 |
| 2015/0097865 A1* | 4/2015 | Subramanian | G06T 19/006 345/633 |
| 2015/0279109 A1* | 10/2015 | Anderson | H04N 5/2621 345/633 |
| 2016/0313902 A1* | 10/2016 | Hill | G06F 3/04847 |
| 2017/0168630 A1* | 6/2017 | Khoshkava | G06F 1/163 |

OTHER PUBLICATIONS

Plesniak W et al: "Tangible Holography Adding Synthetic Touch to 3D Display", Optomechatronic Micro/Nano Devices and Components III : Oct. 8-10, 2007, Lausanne, Switzer [Proceedings of SPIE, ISSN 0277-786X], Feb. 10, 1997.

Yasuaki Monnai et al: "HaptoMime", Oct. 5, 2014.

International Search Report and the Written Opinion issued in PCT Application No. PCT/US2017/037088 dated Jul. 14, 2017.

Volpe, Joseph, "Microsoft's mixed reality is for developers, not the public", Published on: Dec. 17, 2015, Available at: http://www.engadget.com/2015/12/17/microsoft-hololens-is-for-developers-not-the-public/.

Measel, Ryan, "Truly Bringing Toys to Life", Published on: Jun. 17, 2015, Available at: https://medium.com/fantasmo-studios/truly-bringing-toys-to-life-86cc5f5b7544#.up3hioxit.

Gaudiosi, John, "Disney's launching a new line of augmented reality wearable toys", Published on: Jun. 16, 2015, Available at: http://fortune.com/2015/06/16/disney-playmation-wearable-toys/.

Mascioni, Michael, "Augmented Reality: No Longer a Toy", Published on: Feb. 16, 2011, Available at: http://digiday.com/social/augmented-reality-no-longer-a-toy/.

Billinghurst, et al., "Tangible Augmented Reality", In Proceedings of 1st ACM SIGGRAPH Conference and Exhibition in Asia, Dec. 12, 2008, 10 pages.

Uejo, et al., "Active modeling of articulated objects with haptic vision", In Proceedings of the 17th International Conference on Pattern Recognition, vol. 1, Aug. 23, 2004, 5 pages.

* cited by examiner

RELATIONAL RENDERING OF HOLOGRAPHIC OBJECTS

BACKGROUND

Mixed reality ("MR") involves the merging of real-world, physical objects and virtual objects to produce new environments and visualizations where digital virtual objects and real-world physical objects co-exist. MR applications include the arts and entertainment industries, education, manufacturing, engineering design, construction and architecture, for example. However, the advantages of MR are sometimes hampered by limitations in the interactive functionality of virtual or holographic objects within an MR environment, particularly with regard to the limited interactive capabilities between the virtual objects and tangible real-world objects within the MR environment.

The subject matter claimed herein is not limited to embodiments that solve any disadvantages or that operate only in environments described above. Rather, this background is only provided to illustrate exemplary technology areas where some embodiments described herein may be practiced.

BRIEF SUMMARY

The present disclosure relates to computer systems, methods, and computer storage media configured for simulating or otherwise rendering physical interactions between holographic objects and physical objects according to respective physical properties and relationships between the holographic objects and the physical objects.

Some embodiments include identifying a physical object and identifying a holographic object, the physical object and the holographic object being associated with each other according to a physical relationship between the physical object and the holographic object. For example, the physical relationship may be defined by one or more of relative proximity, relative orientation, relative movement pattern, rapidity of relative movement, logical context, duration of relative proximity, orientation, or movement, or other attribute of the physical relationship. In some embodiments, the physical attributes or properties of the physical object and assigned physical properties/attributes of the holographic object also help to define the physical relationships between the holographic object and the physical object.

Some embodiments include detecting a change to the physical relationship and modifying one or more properties of the holographic object in accordance with the detected change. For example, in response to detecting a change to the physical relationship, the holographic object can be reconfigured with one or more different audiovisual characteristics. Additionally, or alternatively, the holographic object is reconfigured to exhibit a modified state or setting affecting user interaction with the reconfigured holographic object, whether or not an audiovisual indication of the modification is immediately apparent.

Some embodiments include assigning one or more properties to a physical object and/or to a holographic object. In such embodiments, the one or more assigned properties define, at least in part, one or more reactions of the holographic object according to the physical relationship between the holographic object and the physical object. In some embodiments, properties assigned to a physical object are configured as virtual properties that do not correspond to real-world properties of the physical object.

Certain embodiments include detecting a change to one or more aspects of a physical relationship between an identified physical object and an identified holographic object and, in response, generating a new holographic object to simulate activity and/or effects of the identified holographic object on the physical object. In some embodiments, the identified holographic object remains unmodified as the new holographic object is rendered.

Some embodiments include modifying a physical object or device in response to detecting a change to one or more aspects of a physical relationship between the physical object or device and an associated holographic object.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

The present disclosure relates to computer systems, methods, and computer storage media configured for rendering one or more holographic objects in accordance with a determined relationship between the one or more holographic objects and one or more physical objects within a mixed reality environment. Various technical effects and benefits may be achieved by implementing aspects of the disclosed embodiments. For example, at least some disclosed embodiments are operable to augment the functionality of a holographic object by defining one or more relationships between the holographic object and one or more physical objects within the same MR environment of the holographic object. This can be particularly beneficial for improving user experience during interaction with holographic objects, for increasing the perception of realism portrayed by the holographic object, for increasing the scope of available interactive functionality of the holographic object and, in short, for improving the general functionality of MR computing systems by enabling them to provide increased realism of interactions between holographic objects and real-world objects.

As used herein, the terms "hologram," "hologram object," "holographic object," and the like refer to virtual, rendered images and/or animations that include one or more three-dimensional visual cues, such as depth cues, parallax effects, and/or perspective visualizations that realistically change based on the relative viewpoint of an observer.

As user herein, the terms "physical object," "tangible object," and the like refer to actual physical objects existing within the real-world and which observed within an environment in which one or more holographic objects may be superimposed upon and/or rendered within to form a MR environment.

As used herein, the terms "mixed reality (MR)," "augmented reality," and the like refer to displays, applications, scenes, and/or environments combining one or more physical objects with one or more holographic objects. In some embodiments, the one or more holographic objects are superimposed upon and/or are rendered within a physical scene, such that the display as perceived by a user includes the one or more holographic objects within the physical scene.

A "relationship," "physical relationship," or "association" between a holographic object and a physical object may be defined by and/or may refer to proximity of one object relative to another, orientation of one object relative to another, a movement pattern of one object relative to another, rapidity of movement of one object relative to another, duration of one or more of the foregoing, or combinations thereof, for example. In some embodiments, the relationship may also be defined at least in part according to context within the mixed reality environment shared by the holographic object and the physical object. For example, in a gaming application, a pair of related holographic and physical objects may interact differently depending on a game level, user status, difficulty setting, gameplay mode, and the like. In another example, in a 3D modeling/visualization application, a pair of related holographic and physical objects may interact differently depending on an application state, such as a visualization mode versus an editing mode.

The physical relationship may also be defined, at least in part, based on the physical properties of the objects, including actual or assigned properties of the physical object(s) and the holographic object(s). For instance, in addition to the relationship being defined by the physical locations and orientations of the objects, the physical relationships may also be defined by or include a chemical relationship, magnetic relationship, temperature relationship, dynamic stress or compression relationship and/or any other interactive relationship associated with interactive states existing between the objects based upon their assigned physical properties (whether the properties are real or only virtually assigned).

The term "physical property" may refer to any physical attribute or property associated with a physical object, including (but not limited to) temperature, hardness, shape, material composition, size, weight, conductivity, color, reflectivity, strength, viscosity, volume, opacity, malleability, brittleness, elasticity, pressure, electric charge, velocity, radiance, power, and so forth. These physical properties may be assigned to holographic objects, as well as physical objects. Accordingly, a physical object may be assigned an actual or virtual physical property within the MR environment. These physical properties may also be mapped/stored and changed within the MR environment, as described herein, based on the MR interactions.

The physical properties are sometimes referred to herein as physical object properties or holographic object properties, depending on whether they correspond to physical objects or holographic objects, respectively.

Figure 1:
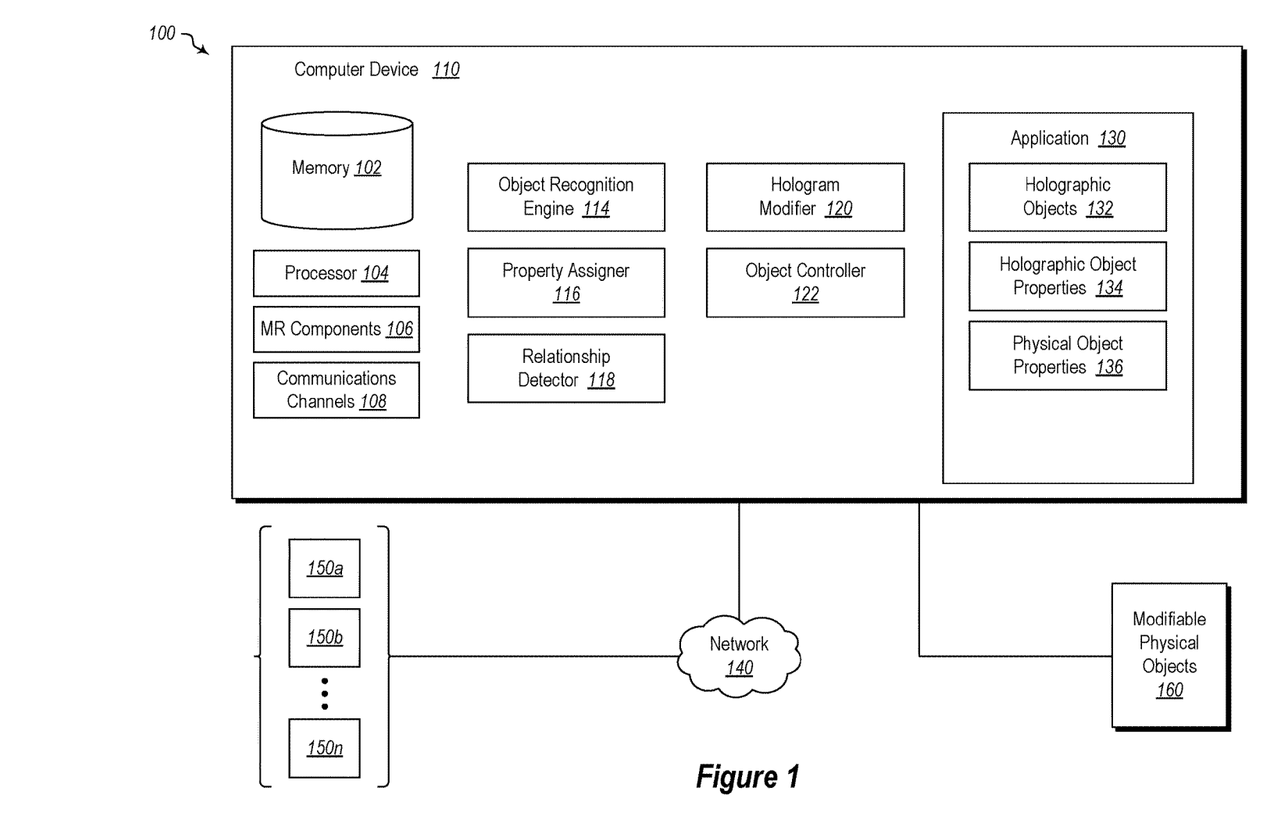
FIG. 1 illustrates a computer system configured for rendering a holographic object according to a physical relationship between a holographic object and a physical object.

FIG. 1 illustrates an exemplary computer system 100 configured for rendering one or more holographic objects according to one or more relationships between the one or more holographic objects and one or more physical objects. For the sake of simplicity, embodiments described herein will typically refer to "a" holographic object having "a" relationship with "a" physical object, although one of skill in the art will understand that the scope of these described embodiments also extends to the rendering of one or more holographic objects according to one or more relationships with one or more physical objects.

As shown, the illustrated computer system 100 includes a computer device 110 with a memory 102 and at least one processor 104. Alternative embodiments may include a plurality of processors and/or memory storage devices. The memory 102 may be physical system memory, which may be volatile, non-volatile, or some combination of the two. The term "memory" may also be used herein to refer to non-volatile mass storage such as physical storage media.

The computer device 110 also includes MR components 106 configured to enable generation and display of a MR environment, including one or more user headsets, cameras, image projectors, and/or other components that may be used in the generation of a mixed reality environment. In some embodiments, the MR components 106 also include one or more additional input/output components enabling a user to interact with the computer device 110, including one or more haptic feedback components (e.g., wearable components), display screens, keyboards, mouse controls, touch screens, microphones, speakers, display screens, track balls, scroll wheels, biometric sensors (e.g., electroencephalography sensors (EEG), heart rate monitors, eye tracking or body movement tracking devices, body temperature sensors), and the like to enable the receiving of information from a user and for displaying or otherwise communicating information to a user.

The illustrated computer device 110 includes communication channels 108 that enable the computer device 110 to communicate with one or more separate computer devices or systems. For example, the computer device 110 may be a part of network 140, which may be configured as a Local Area Network ("LAN"), a Wide Area Network ("WAN"), or the Internet, for example. In some embodiments, the computer device 110 communicates with and/or is part of a distributed computer environment 150, as indicated by the plurality of separate computer systems 150a through 150n, each of which may contain one or more of the disclosed components that are shown in system 100, entirely or partially, such as one or more of the memory components, application components, or any of the other components.

The computer device 110 also includes executable modules or executable components 114-122, described in more detail below. As used herein, the term "executable module" or "executable component" can refer to software objects, routines, or methods that may be executed on the computing system. The different components, modules, engines, and services described herein may be implemented as objects or processes that execute on the computing system.

The illustrated computer device 110 also includes an application 130 capable of operation on the computer device 110. The application 130 may be a gaming application, an audiovisual application, a 3D modeling/visualization application, a graphic design application, an engineering modeling application, an architectural design application, or any other application that utilizes a MR display operable to render at least one holographic object within or overlying a physical reality scene.

As shown, the application 130 includes one or more holographic objects 132 having one or more assigned holographic object properties 134. For example, a particular holographic object may have one or more properties defining the manner in which the holographic object is displayed (e.g. audio and/or visual effects), the manner in which the holographic object reacts to user input, and/or the manner in which the holographic object interacts with other elements of the mixed reality environment in which it is rendered. For example, a holographic object configured to be rendered as a boulder may have a set of assigned holographic object properties including "heavy," "hard," "dense," and the like, while a holographic object configured to be rendered as a glass vase may have a set of assigned holographic object properties including "fragile," "breakable," "fellable," "inflexible," and the like.

In the illustrated embodiment, the application 130 also includes a set of one or more physical object properties 136 defining properties that are assignable to one or more physical objects detectable by the application 130. For example, a wall, floor, or ceiling detected within a MR scene may have a set of assigned object properties including "impenetrable," "impassable," and the like. In some embodiments, one or more physical object properties 136 are virtual properties that do not necessarily correspond to actual physical properties of the physical object to which they are assigned. For example, in a gaming application, a toy sword may be configured with a set of physical object properties including "sharp" and "rigid" even though the toy sword is actually dull and relatively flexible.

Different holographic object properties 134 of a particular holographic object 132 may be static or may be dynamic and/or modifiable. For example, some holographic object properties 134 or physical object properties 136 may be configured to change over time and/or to change according to user settings, application state, game level, etc.

As shown, the application 130 also includes a set of one or more relationship definitions 138 defining detectable relationships between one or more detectable physical objects and one or more holographic objects 132. As explained in more detail below, in some embodiments, the detection of a particular relationship between a holographic object and a physical object operates to cause one or more of modification to the holographic object, rendering of one or more new holographic objects, or modification to the physical object.

The illustrated computer device 110 also includes an object recognition engine 114 configured for detecting and/or identifying one or more physical objects within a mixed reality scene. The object recognition engine 114 may be operable to detect and identify objects using edge, ridge, and corner detection, gradient matching, and other models and algorithms know in the art.

The illustrated computer device 110 also includes a property assigner 116 configured to assign the physical object properties 136 to corresponding physical objects upon detection of the physical objects. For example, in some instances, the application 130 includes a physical object property 136 defining windows as being "shatterable" and "reflective" (e.g., whether or not they are actually physically shatterable or reflective). Upon detection of a window within a mixed reality scene by the object recognition engine 114, the property assigner 116 assigns the "shatterable" and "reflective" properties to the detected window.

In some embodiments, the property assigner 116 is also configured to assign holographic object properties 134 to corresponding holographic objects 132. In other embodiments, holographic object properties 134 are assigned to holographic properties 132 by the application 130 itself.

The illustrated computer device 110 also includes a relationship detector 118 configured to detect and identify a relationship between a holographic object 132 and a detected physical object. Continuing with the window example, the relationship detector 118 may detect a relationship between the window and a holographic baseball defined by the proximity and trajectory of the holographic baseball relative to the window, or may detect a relationship between the window and a holographic laser beam defined by the orientation/aim of the holographic laser beam relative to the window.

The illustrated computer device 110 also includes a hologram modifier 120 configured to control the rendering of a holographic object 132 according to a detected relationship between the holographic object 132 and a detected physical object satisfying a predetermined relationship definition 138. Continuing with the window example, as the holographic baseball's trajectory aligns with the window, as detected by the relationship detector 118, according to a relationship definition 138 defining that windows having the "shatterable" property will shatter under such a relationship, the hologram modifier 120 is operable to render a shattering effect as the holographic baseball passes into the window. The shattering effect may include the generation of holographic shards animated as falling from the window, holographic cracks remaining in the window, and/or shattering sound effects, for example. In another example, as the orientation of the holographic laser beam faces the window, as detected by the relationship detector 118, according to a relationship definition 138 defining that windows having the "reflective" property will reflect laser beams, the hologram modifier 120 is operable to modify the holographic laser beam as reflecting off of the window (e.g., based on the angle of the laser beam relative to the window).

The illustrated computer device 110 also includes an object controller 122. In some embodiments, one or more modifiable physical objects 160 within the mixed reality scene are configured as actuatable or modifiable in response to particular detected relationships between the one or more modifiable physical objects 160 and one or more holographic objects 132. For example, a modifiable physical object 160 may be a fan, and the fan may be powered on and off according to the proximity of a holographic power cable to the fan (e.g., as defined by a relationship definition 138 and as detected by the relationship detector 118).

The various components illustrated in FIG. 1 represent only a few example implementations of a computer system configured for rendering a holographic object according to a detected relationship between the holographic object and a physical object. Other embodiments may divide the described memory/storage, modules, components, and/or functions differently between the application 130 and the computer device 110 (e.g., the operating system of the computer device 110), and/or among additional computer systems. For example, in some embodiments the property assigner 116, relationship detector 118, and/or hologram modifier 120 are managed and controlled by the application 130. In some embodiments, data structures related to the holographic objects 132, holographic object properties 134, physical object properties 136, and/or the relationship definitions 138, are received from one or more separate computer devices/systems, such as from one or more computer devices 150*a-n*.

In some embodiments, memory components and/or program modules are distributed across a plurality of constituent computer systems (e.g., 150*a-n*) in a distributed environment. In other embodiments, memory components and program modules are included in a single integrated computer system. Accordingly, the systems and methods described herein are not intended to be limited based on the particular location at which the described components are located and/or at which their functions are performed.

In the description that follows, embodiments are described with reference to acts that are performed by one or more computing systems. If such acts are implemented in software, one or more processors of the associated computing system that performs the act direct the operation of the computing system in response to the processor(s) of the computing system having executed computer-executable instructions that are embodied on one or more computer-readable media (e.g., hardware storage device(s)). An example of such an operation involves the manipulation of data.

The computer-executable instructions (and the manipulated data) may be stored in the memory 102 of the computer device 110, and/or in one or more separate computer system components. The computer-executable instructions may be used to implement and/or instantiate all of the functionality disclosed herein, including the functionality that is disclosed in reference to one or more of the flow diagrams of FIGS. 2 through 4. The following description of the computer-implemented methods illustrated by FIGS. 2 through 4 include example applications and computer systems. One of skill in the art will understand that the particular methods are not limited to the particular examples used. Likewise, one of skill in the art will understand that a particular example application or computer system need not be confined to the particular embodiment in which it is described, but may be utilized in whole or in part in one or more of the other embodiments described herein.

Figure 2:
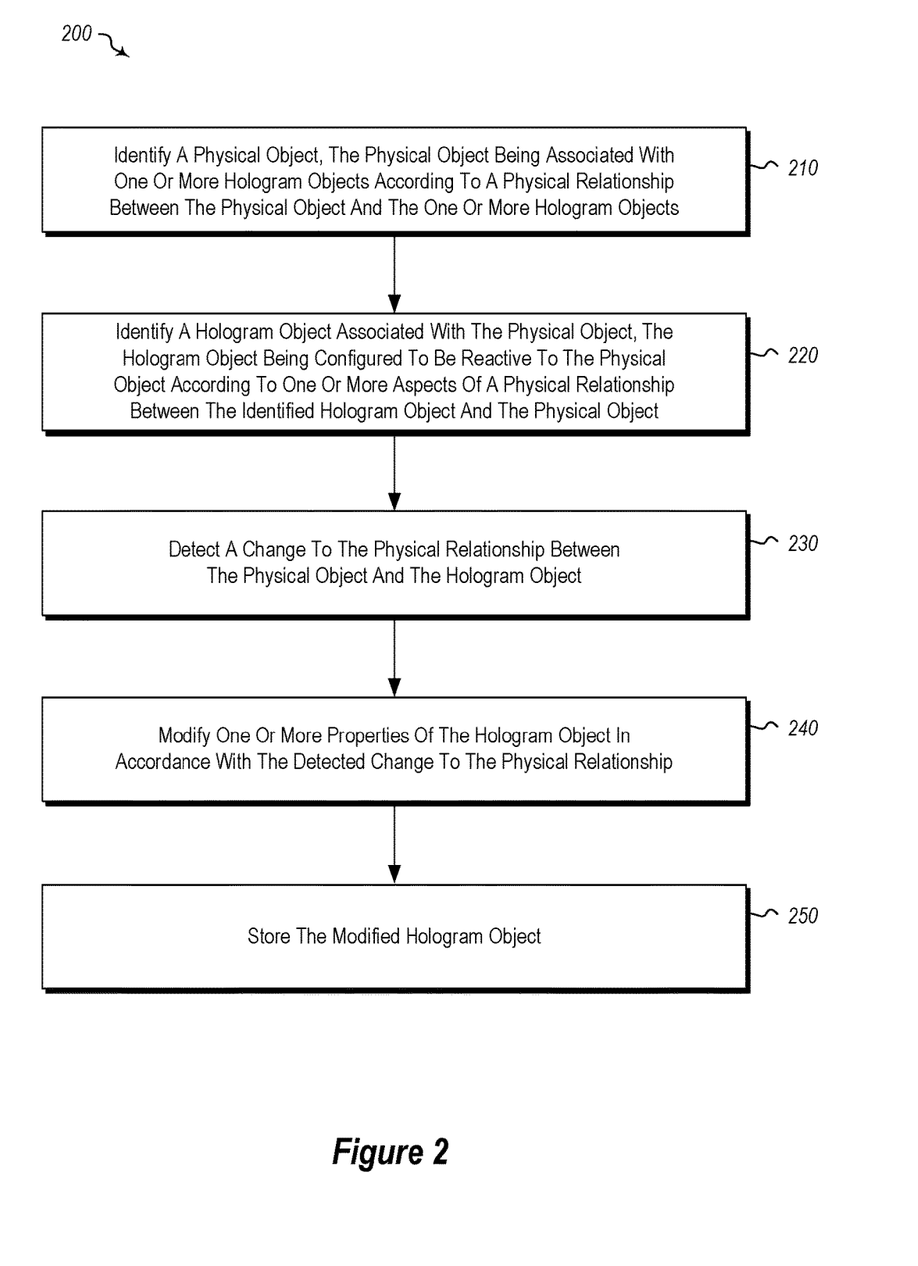
FIG. 2 illustrates a flowchart of an exemplary method for modifying a holographic object according to a physical relationship between a holographic object and a physical object

FIG. 2 is a flowchart 200 of acts associated with computer-implemented methods for reconfiguring a hologram according to a physical relationship between the hologram and one or more physical objects. As shown, a computer system identifies a physical object, the physical object being associated with one or more hologram objects according to a physical relationship between the physical object and the one or more hologram objects (act 210). This relationship may be based on the stored holographic object properties and physical object properties associated with the corresponding objects, as previously described above.

The computer system also identifies a hologram object associated with the physical object, the hologram object being configured to be reactive to the physical object according to one or more aspects of a physical relationship between the identified hologram object and the physical object act 220). By way of example, the identified physical object may be a wand, and the identified hologram object may be a gaming character configured to be reactive to the wand according to proximity to the want, orientation of the wand with respect to the character, and/or duration of the proximity or orientation.

The computer system subsequently detects a change to the physical relationship between the physical object and the hologram object (act 230) and modifies one or more properties of the hologram object in accordance with the detected change to the physical relationship (act 240). For example, the computer system may detect that the wand has been positioned closer to the character and/or has been pointed at the character for a sufficient duration of time. In response, the computer system may modify a character attribute, such as by upgrading or downgrading a health level, strength level, or other attribute. The computer system then stores the modified hologram object (act 250) and updated object properties.

In some embodiments, the modification to the hologram object causes a change to the audio or visual rendering of the hologram object. For example, the holographic character may clap his/her hands or hunch over in pain. Additionally, or alternatively, the modification to the holographic object causes a change to a setting or attribute of the holographic object that may not be immediately shown through visually or audibly. For example, the holographic character may "level-up" and be granted additional functionality, or another change in a holographic object property may change, but such additional functionality or physical property change may not be visibly apparent or manifest until a later time, if or when further gameplay directs.

Figure 3:
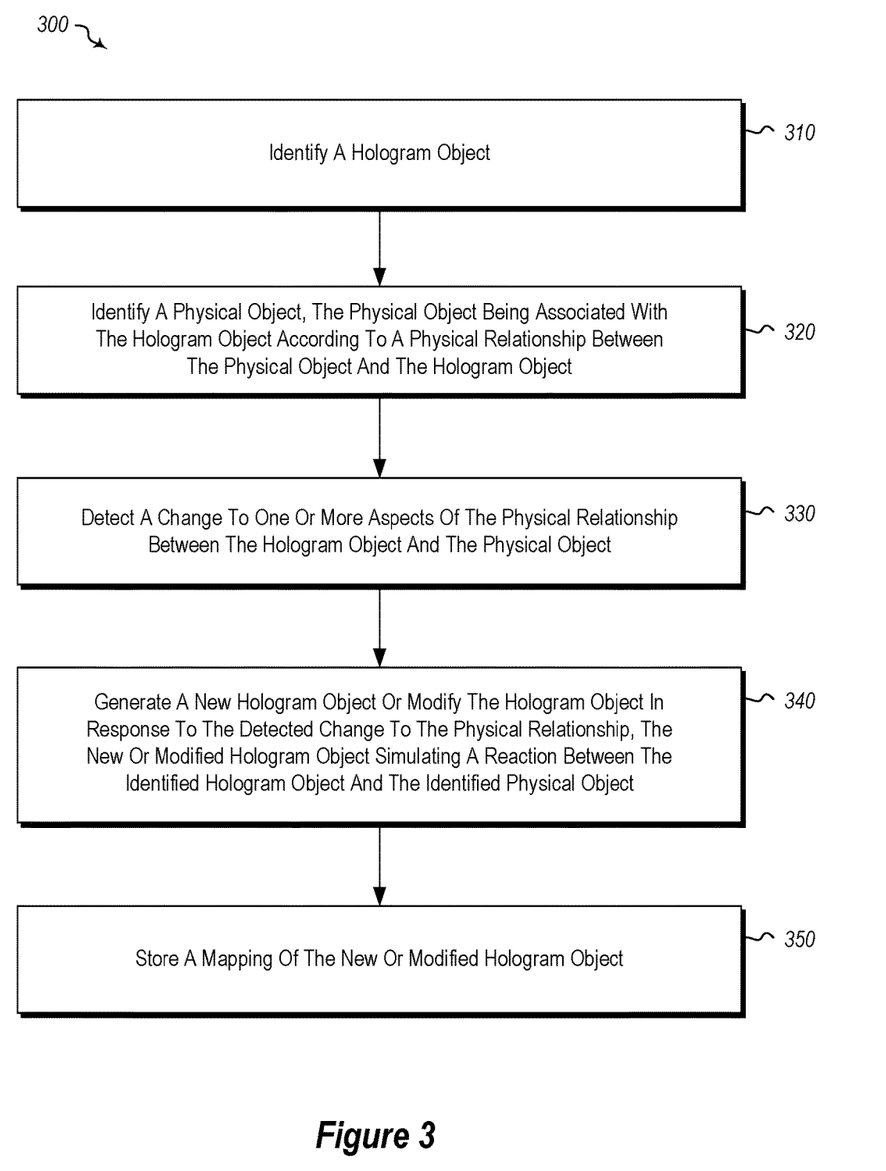
FIG. 3 illustrates a flowchart of an exemplary method for rendering a new holographic object or modifying a holographic object according to a physical relationship between a holographic object and a physical object.

FIG. 3 illustrates a flowchart 300 of a computer-implemented method for generating a new hologram or modifying a hologram according to a physical relationship between a hologram and one or more physical objects. A computer system identifies a hologram object (act 310), and identifies a physical object, the physical object being associated with the hologram object according to a physical relationships between the physical object and the hologram object (act 320). For example, the identified hologram object may be a holographic torch, and the identified physical object may be a fire log (e.g., real or synthetic).

The computer system also detects a change to one or more aspects of the physical relationship between the hologram object and the physical object (act 330), and generates a new hologram object or modify the hologram object in response to the detected change to the physical relationship, the new or modified hologram object simulating a reaction between the identified hologram object and the identified physical object (act 340). The computer system then stores a mapping of the new or modified hologram object (act 350). For example, as the holographic torch is brought into sufficient proximity and appropriate orientation to the fire log (e.g., so that the lit end of the torch "touches" the fire log), the computer system generates a new hologram by rendering a holographic flame surrounding the fire log. Then, when the user or another entity views the fire log through a MR visual system, they will view the holographic flame surrounding the fire log, as the holographic flame has been associated with and mapped to the fire log.

Figure 4:
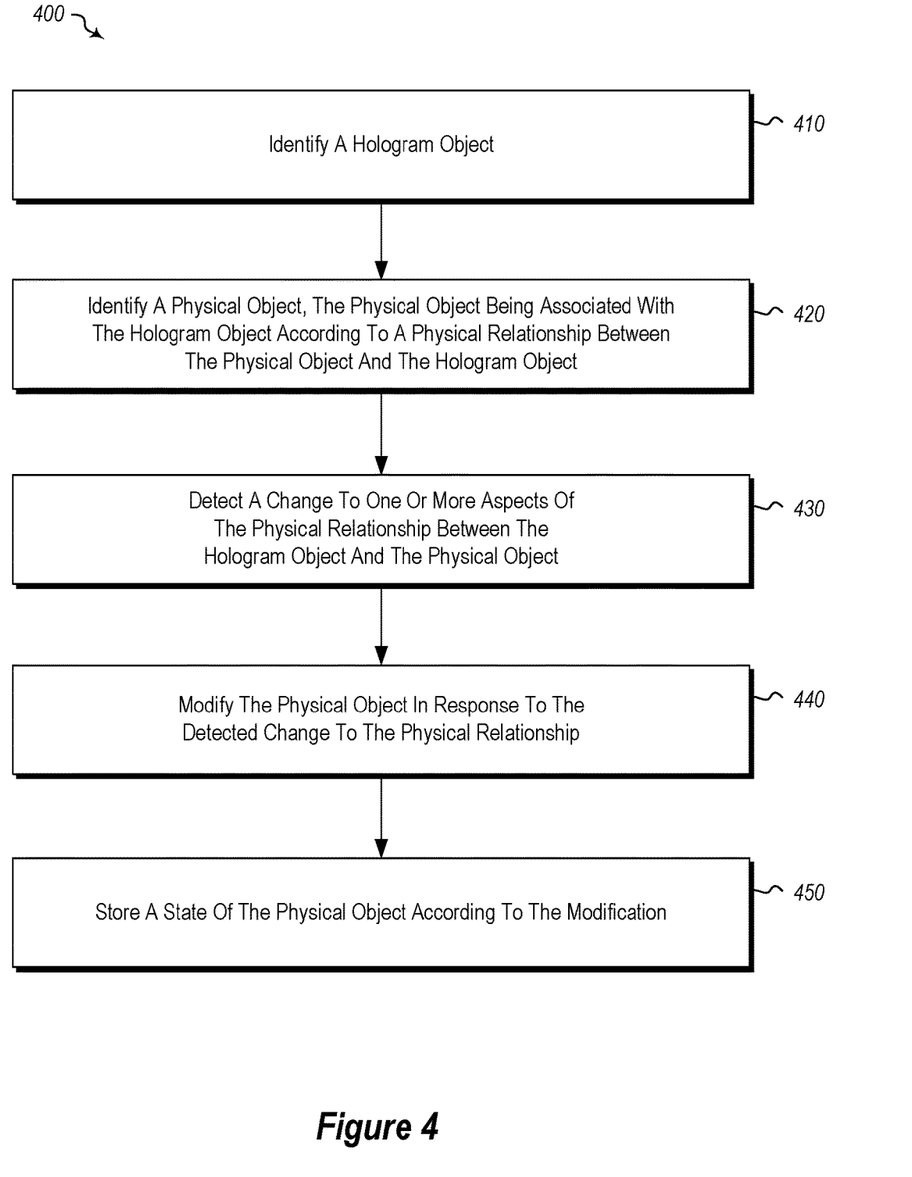
FIG. 4 illustrates a flowchart of an exemplary method for modifying a physical device in response to simulated activity of a holographic object.

FIG. 4 illustrates a flowchart 400 of a computer-implemented method for modifying a physical device in response to simulated activity or associated physical property of a hologram. As shown, a computer system identifies a hologram object (act 410), and identifies a physical object, the physical object being associated with the hologram object according to a physical relationship between the physical object and the hologram object (act 420). For example, the identified hologram object may be a holographic battery, and the identified physical object may be a display screen.

The computer system also detects a change to one or more aspects of the physical relationship between the hologram object and the physical object (act 430) and the physical object in response to the detected change to the physical relationship (act 440). The computer system may then store a state of the physical object according to the modification (act 450). For example, the computer system may detect that the battery has been positioned adjacent to the display screen, and may turn on the display screen in response.

FIGS. 5-9 illustrate operation and functionality of various exemplary embodiments. The scope of the concepts and features described herein and recited in the claims is not limited to these particular illustrated examples, nor the referenced types of applications.

Figure 5:
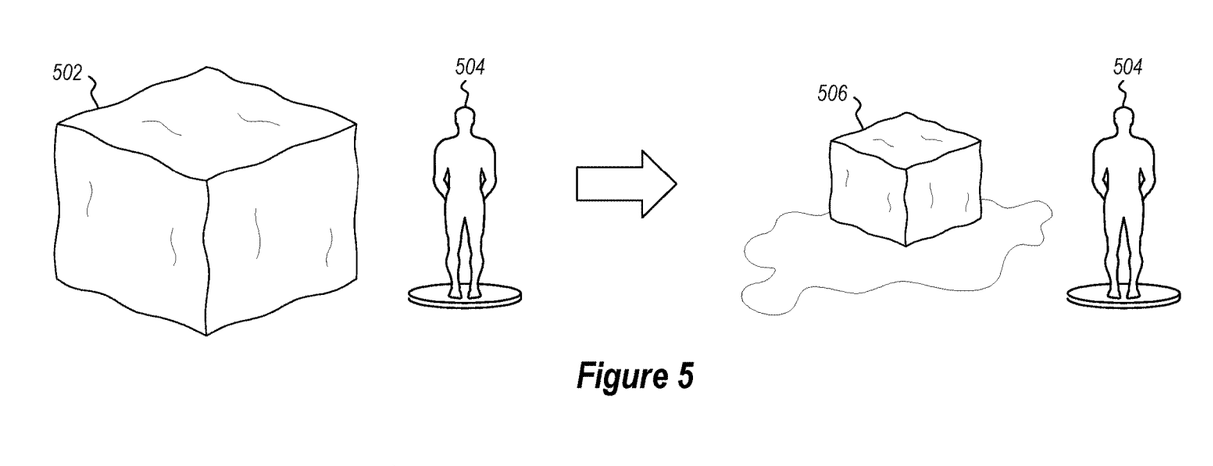
FIGS. 5-8 illustrate exemplary embodiments of mixed reality environments including holographic objects and physical objects, showing rendering of holographic objects according to physical relationships between the holographic objects and the physical objects.

FIG. 5 illustrates a MR environment including a holographic ice block 502 and a physical object in the form of a figurine 504. In this example, the figurine 504 has been assigned the property of "hot" and the holographic ice block 502 has been assigned the property of "meltable," such that when the figurine 504 and the ice block 502 are positioned with sufficient proximity for a sufficient amount of time, the holographic ice block is rendered as a holographic melting ice block 506.

In some embodiments, the degree of the exhibited modification effect can progress according to the relative degree of the physical relationship between the physical object and the holographic object. For example, the holographic ice block 502 may melt faster if the figurine 504 is positioned closer to the ice block 502. In addition, as the duration of the physical relationship continues, the holographic ice block 502 may progress over time to become even more melted, until it becomes a puddle or even until it evaporates and disappears completely.

Figure 6:
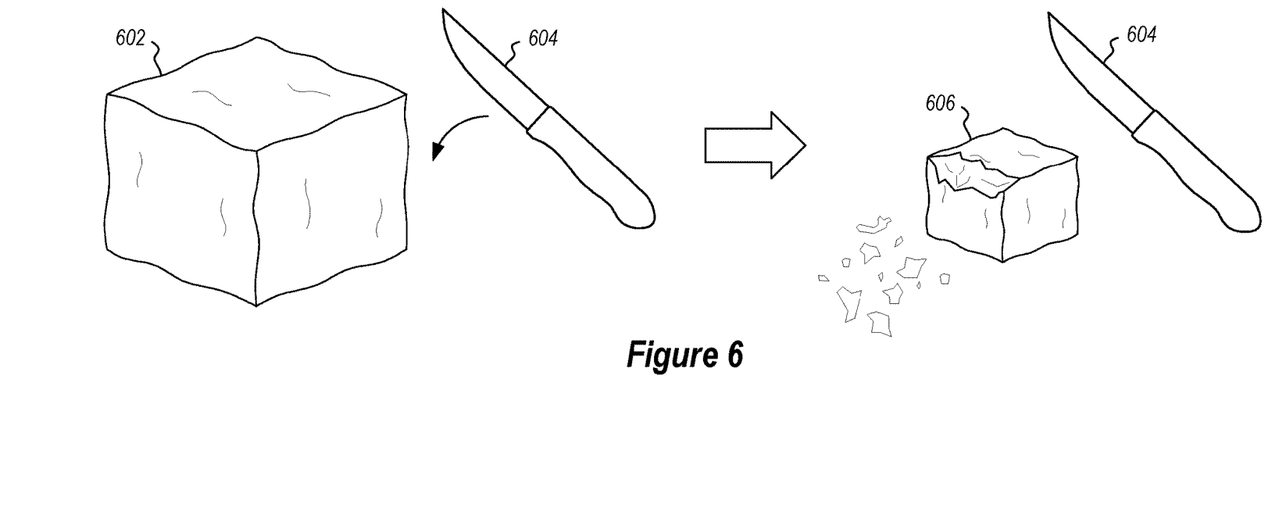

FIG. 6 illustrates a mixed reality environment including a holographic ice block 602 and a physical object in the form of a knife 604 (e.g., a toy knife). In this example, the knife 604 has been assigned the property of "sharp" and the holographic ice block 602 has been assigned the property of "chippable," such that when the knife 604 and the ice block 602 are brought into sufficient proximity with the appropriate orientation (e.g., knife blade facing the ice block 602), the holographic ice block 602 is rendered as a chipped ice block 606. The chipping may also occur dynamically in real-time as the knife is brought into contact (i.e., visual intersection) with the ice block 602 in the MR environment.

The examples shown by FIGS. 5 and 6 illustrate that a particular holographic object may have a plurality of different properties and may exhibit a plurality of corresponding effects based on different interactions with different physical objects. For example, in some embodiments, the ice block 502 and the ice block 602 may represent the same holographic object configured to react differently according to physical relationships with different physical objects (e.g., the figurine 504 and the knife 604). Additionally, or alternatively, in some embodiments a particular holographic object may react differently to the same associated physical object depending on the particular parameters of the physical relationship between the respective objects (see FIG. 8).

Figure 7:
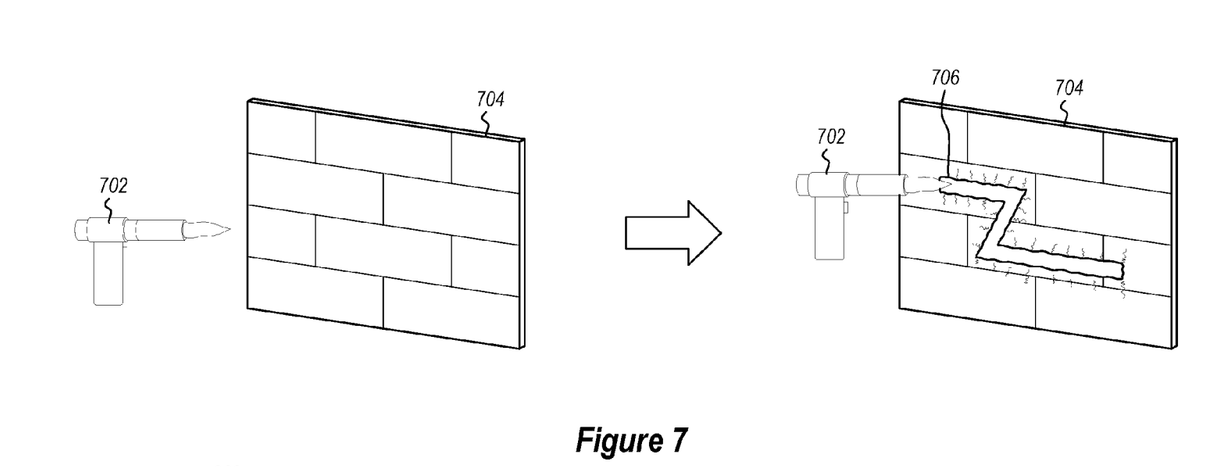

FIG. 7 illustrates a mixed reality environment including a holographic blow torch 702 and a physical wall 704. In this example, the holographic blow torch 702 has been assigned the property of "scorching," and the wall 704 has been assigned the property of "burnable." As shown, as the holographic blow torch 702 changes position with respect to the wall 704, a new hologram 706 is generated simulating a scorching effect on the wall 704. In this example, the functional relationship is between the holographic blow torch 702 and the physical wall 704, and the resulting effect is one or more new hologram (i.e., the new hologram 706 of a charred portion of the wall that is persistently saved in the MR data files with a mapped location of the wall, as well as a hologram of smoke (not presently shown) that may only be temporary, etc.) while the original holographic object (i.e., the blow torch 702) remains unmodified.

Figure 8:
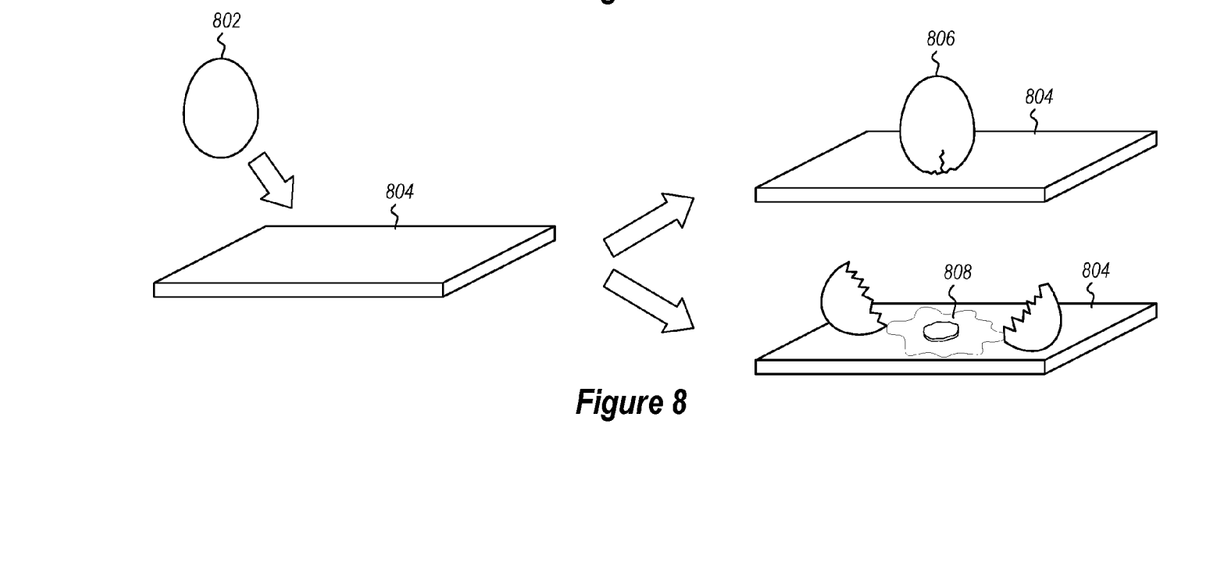

FIG. 8 illustrates a mixed reality environment including a holographic egg 802 and a physical surface 804 (e.g., a tabletop). In this example, the holographic egg 802 has been assigned the property of "fragile" and the surface 804 has been assigned the property of "hard," such that if the holographic egg 802 is brought into contact with the surface 804 with sufficient force/rapidity within the MR environment, the holographic egg 802 will break. For example, if the holographic egg 802 is contacted with the surface 804 with relatively less force or rapidity, the egg 802 is rendered as a cracked but still intact holographic egg 806. In contrast, if the holographic egg 802 is contacted with the surface 804 with relatively greater force or rapidity, the egg 802 is rendered as a completely cracked holographic egg 808.

Figure 9:
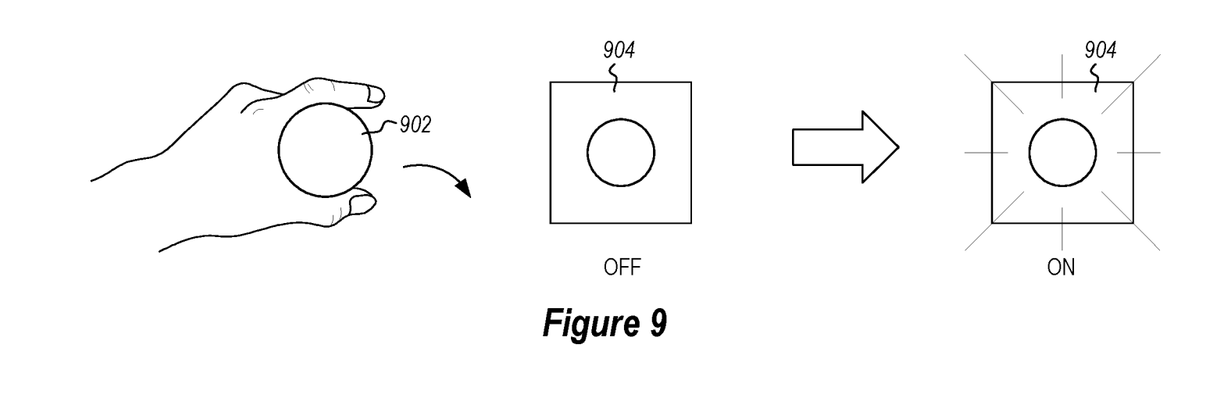
FIG. 9 illustrates an exemplary embodiment of a mixed reality environment in which a holographic object is operable to modify a physical object according to a physical relationship between the holographic object and the physical object.

FIG. 9 illustrates an embodiment of a mixed reality environment including a holographic orb 902 and a physical light bulb 904. In this example, the properties of the light bulb 904 (e.g., on and off states, color, etc.) are affected by the physical relationship between the holographic orb 902 and the light bulb 904. For example, as the holographic orb 902 is "thrown" at the light bulb 904, a change in the physical proximity between the objects is detected, causing the light bulb 904 to light up, by causing a switch to be activated for the light bulb 904 through the connected systems. Similar embodiments may include interaction between a holographic object and an audio control (e.g., volume control), display control, power controls, actuation mechanisms, and/or other interactions between actuatable or adjustable physical objects and holographic objects.

The disclosed embodiments may comprise or utilize a special-purpose or general-purpose computer system that includes computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, virtual or augmented reality headsets, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented by a computing system, the method comprising:
    identifying a hologram object;
    identifying a physical object, the physical object being associated with the hologram object according to a defined chemical or thermal relationship existing between the physical object and the hologram object based on one or more chemical or thermal properties assigned to the physical object and the hologram object;
    detecting a change to a proximity between the hologram object and the physical object;
    generating a new hologram object or a modified hologram object in response to the detected change to the proximity between the hologram object and the physical object and based on the defined chemical or thermal relationship, the new or modified hologram object simulating a chemical or thermal reaction between the hologram object and the physical object based on the defined chemical or thermal relationship, wherein the simulated chemical or thermal reaction is based not only on the proximity between the hologram object and the physical object but also based on a timing duration where the hologram object is within a proximate distance to the physical object such that a degree of a progression or intensity of the simulated chemical or thermal reaction between the hologram object and the physical object is dependent on the timing duration, and wherein the hologram object is configured to react differently according to physical relationships with different physical objects, including the physical object; and storing a mapping of the new or modified hologram object.

2. The method of claim 1, wherein the method further includes assigning one or more virtual properties to the physical object, the one or more virtual properties defining at least in part one or more reactions of the hologram object according to the defined chemical or thermal relationship between the physical object and the hologram object.

3. The method of claim 2, wherein one or more of the virtual properties do not correspond to actual physical properties of the physical object.

4. The method of claim 2, wherein the method further includes assigning one or more properties to the hologram object, the one or more properties defining at least in part one or more reactions of the hologram object according to the defined chemical or thermal relationship between the physical object and the hologram object.

5. The method of claim 1, wherein the method further includes assigning one or more properties to the hologram object, the one or more properties defining at least in part one or more reactions of the hologram object according to the defined chemical or thermal relationship between the physical object and the hologram object.

6. The method of claim 1, wherein the method further includes detecting a change in orientation between the physical object relative to the hologram object.

7. The method of claim 1, wherein the method includes modifying the hologram object in response to the detected change to the proximity, and wherein the modification of the hologram object varies according to a degree of the detected change to the proximity.

8. The method of claim 1, wherein the method includes modifying the hologram object in response to the detected change to the proximity and wherein the modification of the hologram object includes a modification to an audiovisual display of the hologram object.

9. The method of claim 1, wherein the method includes modifying the hologram object in response to the detected change to the proximity and wherein the modification of the hologram object includes a modification to a setting or state of the hologram object which is not manifested audibly or visually until at least one or more additional inputs are received.

10. A computer system configured for generating a new hologram or modifying a hologram according to both a physical relationship and a timing duration of that physical relationship between a hologram and one or more physical objects, the computer system comprising:
one or more processors; and
one or more hardware storage devices having stored thereon computer-executable instructions which are executable by the one or more processors to cause the computer system to perform at least the following:
identify a hologram object;
identify a physical object, the physical object being associated with the hologram object according to a defined chemical or thermal relationship existing between the physical object and the hologram object based on one or more chemical or thermal properties assigned to the physical object and the hologram object;
detect a change to a proximity between the hologram object and the physical object;
generate a new hologram object or a modified hologram object in response to the detected change to the proximity between the hologram object and the physical object and based on the defined chemical or thermal relationship, the new or modified hologram object simulating a chemical or thermal reaction between the hologram object and the physical object based on the defined chemical or thermal relationship, wherein the simulated chemical or thermal reaction is based not only on the proximity between the hologram object and the physical object but also based on a timing duration where the hologram object is within a proximate distance to the physical object such that a degree of a progression or intensity of the simulated chemical or thermal reaction between the hologram object and the physical object is dependent on the timing duration, and wherein the hologram object is configured to react differently according to physical relationships with different physical objects, including the physical object; and
store a mapping of the new or modified hologram object.

11. The computer system of claim 10, wherein the computer-executable instructions are also executable to cause the computer system to assign one or more virtual properties to the physical object, the one or more virtual properties defining at least in part one or more reactions of the hologram object according to the defined chemical or thermal relationship between the physical object and the hologram object.

12. The computer system of claim 10, wherein the computer-executable instructions are also executable to cause the computer system to assign one or more properties to the hologram object, the one or more properties defining at least in part one or more reactions of the hologram object according to the defined chemical or thermal relationship between the physical object and the hologram object.

13. The computer system of claim 10, wherein the new hologram object is generated in response to the detected change to the proximity.

14. The computer system of claim 13, wherein the hologram object remains unmodified.

15. The computer system of claim 13, wherein execution of the computer-executable instructions further causes the computer system to modify the hologram object and wherein modifying the hologram object varies according to a degree of the detected change to the proximity between the physical object and the hologram object.

16. The computer system of claim 10, wherein the detected change to the proximity between the physical object and the hologram object also includes detecting a change in orientation of the physical object relative to the hologram object.

17. One or more hardware storage devices having stored thereon computer-executable instructions which are executable by one or more processors to cause a computer system to perform at least the following:
identify a hologram object;

identify a physical object, the physical object being associated with the hologram object according to a defined chemical or thermal relationship existing between the physical object and the hologram object based on one or more chemical or thermal properties assigned to the physical object and the hologram object;

detect a change to a proximity between the hologram object and the physical object;

generate a new hologram object or a modified hologram object in response to the detected change to the proximity between the hologram object and the physical object and based on the defined chemical or thermal relationship, the new or modified hologram object simulating a chemical or thermal reaction between the hologram object and the physical object based on the defined chemical or thermal relationship, wherein the simulated chemical or thermal reaction is based not only on the proximity between the hologram object and the physical object but also based on a timing duration where the hologram object is within a proximate distance to the physical object such that a degree of a progression or intensity of the simulated chemical or thermal reaction between the hologram object and the physical object is dependent on the timing duration, and wherein the hologram object is configured to react differently according to physical relationships with different physical objects, including the physical object; and store a mapping of the new or modified hologram object.

* * * * *